Patented Oct. 3, 1950

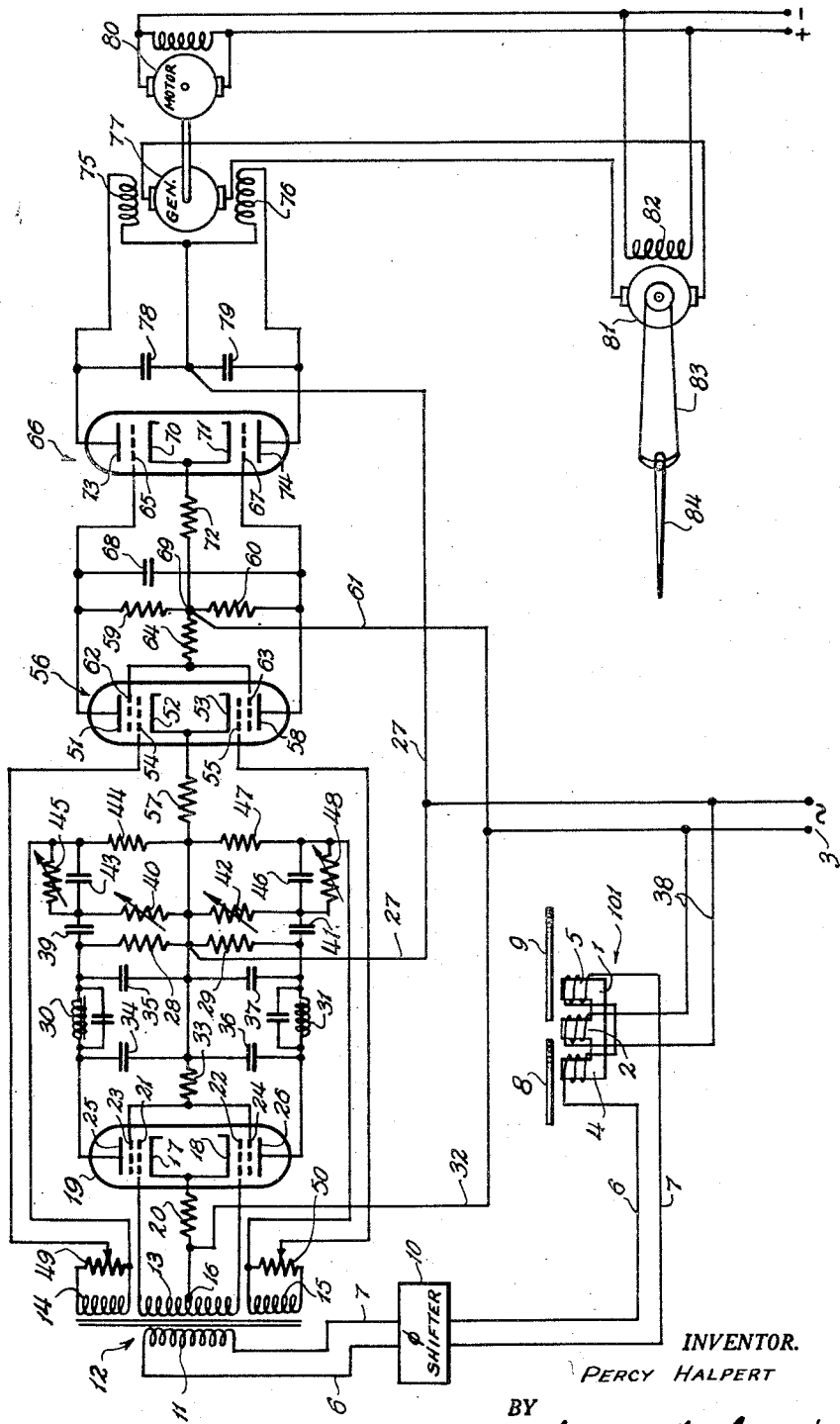

2,524,053

UNITED STATES PATENT OFFICE

2,524,053

DIRECT COUPLED AMPLIFIER FOR SERVO-MOTOR SYSTEMS

Percy Halpert, Hempstead, N. Y., assignor to The Sperry Corporation, a corporation of Delaware Application June 27, 1942, Serial No. 448,794, which is a division of application Serial No. 407,460, August 19, 1941. Divided and this application November 8, 1947, Serial No. 784,874

8 Claims. (Cl. 318—31)

This invention generally relates to positional control systems, for remotely controlling and accurately positioning objects such as searchlights and guns, from an accurately positioned or position-maintaining instrument. Such systems may also be used to control the steering of a dirigible vehicle, such as a ship or airplane, by positioning the rudder or other control surface. Also, they may be employed in straight follow-up systems wherein the position of a follow-up element is accurately maintained with reference to a rotatable control or sensitive element such as a gyro compass or directional gyro.

The present invention specifically relates to an improved amplifier which is primarily adapted for use in systems of the foregoing character. This application is a division of pending application Serial No. 448,794, for Electrical Control Systems, filed June 27, 1942, and now Patent No. 2,462,095, issued February 22, 1949, which in turn is a division of application Serial No. 407,460, for Electrical Control Systems, filed August 19, 1941, and now abandoned, both of which applications were filed in the names of P. Halpert, C. A. Frische, J. L. Bird and O. E. Esval.

In such systems, for example, a pick-off device is provided, such as that shown in Serial No. 448,040, now U. S. Patent No. 2,415,819, for producing an electrical signal in responsive to displacement of the control or sensitive element which reverses phase upon reversal of the displacement. In former pick-off devices of this type, for example that shown in Patent No. 1,959,804, to Wittkuhns et al., issued May 22, 1934, for Non-Contacting Follow-Up System, a useful signal is secured only through a comparatively small angle of deflection of the control element, say 10 degrees or less. The proposed pick-off overcomes this limitation of the prior art and constitutes a pick-off means in which a positive signal is generated for angular deviations approaching 90 degrees. In addition, a pick-off device may be used in which the signal output continuously increases as the deviation increases, rather than one which quickly reaches a maximum constant signal, as is the case in the above-mentioned patent.

It has been recognized that the generation of a simple reversible signal is not sufficient for control purposes even where such signal is proportional to the relative displacement between the position-maintaining device and the controlled device. For obtaining accurate control, I propose to generate an electrical signal which not only varies in phase and magnitude with the direction and amount of relative displacement between the control and controlled device but which also varies with the relative velocity and preferably also a higher time derivative of the relative displacement. This is done by operating electrically in my improved rate amplifier upon the signal obtained from the pick-off means so as to add to this signal certain components representing the velocity and acceleration of the displacement of the controlling object. With this improved system, it is possible to maintain the relative displacement between two objects at practically zero, or to control the position of a remote object with very high accuracy.

Preferably, I employ a Ward Leonard type of control using a motor-generator set, the generator having two opposed field windings. The A. C. reversible phase control signal obtained from the pick-off means is amplified and modified by the addition of velocity and acceleration components in our improved rate amplifier, whose output includes two direct currents which excite the opposed generator field windings to produce one or the other direction of control of the controlled object, in accordance with the phase of the pick-off signal. The controlled object may be a follow-up motor or a servomotor.

Included in my improved amplifier are means for permitting direct coupling of D. C. amplifier stages which are A. C. energized. This may be done by balancing out the fixed bias produced in the output of one stage to prevent its affecting the input of the next stage, and simultaneously providing a signal hold-over means, from one half-cycle of applied energy to the next half-cycle, whereby successive stages may operate successfully despite opposite phase of energization.

Therefore, the primary object of this invention is to provide an improved amplifier in which successive stages thereof are directly coupled together. In other words, my invention resides in providing an amplifier in which the voltage output of one electron tube is coupled directly to the control element or grid of a second electron tube, and my invention resides in providing an amplifier of the foregoing character in which the electron tubes are energized with alternating current.

Another object resides in providing an amplifier of the foregoing character in which the signal voltage output of one stage is held over for a time interval and applied to control the second stage or the electron tube comprised therein. It is also an object to provide an amplifier of the latter character which is energized with alternating current and in which the signal voltage output from a first electron tube is held over for a time interval sufficient to permit out-of-phase energization of successive stages.

Still another object resides in providing an amplifier of the foregoing characters in which a condenser is employed to hold over the voltage output of a first electron tube until a second electron tube, which is directly coupled with the plate of the first electron tube, is rendered conductive.

With the foregoing and still other objects in view, my invention includes the novel elements and the combinations and arrangements thereof described below and illustrated in the accompanying drawing in which the single figure is a wiring diagram of a preferred form of amplifier.

The pick-off means or signal generator as more particularly shown and described in said Patent No. 2,415,819 is a variable inductive device comprising a three-legged transformer 1 adapted to be mounted on a gear follow-up platform which may be rotated from the follow-up motor or secured to move in azimuth, for example, with a craft. The center leg of the transformer is shown as continuously excited from a single phase A. C. source 3 while the two outer legs 4 and 5 are connected in opposition so that their output through lines 6—7 is zero when the transformer is balanced, but is of one phase as the induced current in one leg predominates and of the other phase as the induced current predominates in the other leg. Cooperating with said transformer is shown a pair of soft iron armatures 8 and 9 which may be of nearly semi-circular form, each mounted on a common non-magnetic base adapted, following the above example, to be secured to a vertical stem rising from the vertical ring of a gyroscope through an aperture in the platform or gear carrying the transformer 1, so that said armatures are fixedly oriented in azimuth from the gyroscope. The armature 8 may be of less diameter than armature 9 so that it passes between and above poles 4 and 2 while the armature 9 passes between and above poles 2 and 5. Assuming the poles are positioned in radially spaced relation to the platform, then in the normal balanced condition, the two ends of the armatures lie about on a line with the two outer edges of the poles 4, 2 and 5, in which position there is no net output from the signal generator through lines 6—7, since the voltages induced in legs 5 and 6 then balance one another. Preferably each pole piece is tapered, gradually increasing in cross-sectional area as it recedes from the tips of the armatures. By this means, a signal which increases with angular displacement is secured through a fairly large displacement angle, as opposed to the prior art as indicated by the above cited patent. This form of inductive pick-off also has the advantage that control is not lost except when the angular displacement approaches 90° either side of the balanced position, thus maintaining full control over 180 degrees of arc.

The output from this pick-off device, which is the voltage appearing across terminals 6—7, may be amplified in the rate amplifier of the present invention, which, as will be later described, introduces velocity and acceleration components into the control signal, which then may control a motor to drive the follow-up platform and transformer 1 into correspondence with armatures 8, 9, the system then acting as a follow-up system. The position of the platform, which is thereby kept synchronized with that of the armature and hence with the gyroscope, as assumed, may be transmitted to a remote point as by a Selsyn transmitter to give a suitable remote indication.

Alternatively, the output of the rate amplifier may control any suitable remote motor, such as that herein illustrated to remotely control any suitable object, such as the rudder shown. The system may thereby act as an automatic pilot, turning a craft until the orientation of the platform, which would then be fixed to the craft, corresponds with that of the gyroscope. The craft then acts as the follow-up element of the system.

It will be obvious that the mountings of transformer 1 and armatures 8, 9 may be interchanged; that is, the transformer may be mounted on the vertical ring of the gyro, and the armatures on the platform.

Also, armatures 8, 9, instead of tapering from the center toward both ends, might taper continuously from one end to the other. This would give full 360 degrees of control with continuously increasing signal.

Alternatively, the poles of the transformer may be arranged in circumferentially spaced relation instead of radially. In this case, the center pole 2 is of greater width than the outer poles 4 and 5 and the gyro stabilized armatures 8 and 9 may be of uniform width. With this construction, armature 8 effectively cooperates only with poles 4 and 2, while armature 9 cooperates only with poles 5 and 2.

With this type of pick-off, a sharp increase in signal output is obtained for small displacements of armatures 8, 9 relative to transformer 1, but the signal does not vary with displacement over a wide angle, as is the case with the pick-off device first above described. However, full control is maintained over the entire 360 degrees of rotation.

The signal output from the pick-off unit 1 is fed through phase-shifter 10 to primary winding 11 of input transformer 12 by wires 6—7. Transformer 12 has a center tapped secondary winding 13 and two other similar secondary windings 14 and 15. Center tap 16 of winding 13 is connected to the cathodes 17, 18 of duplex tube 19 by way of cathode bias resistor 20 whose resistance value is selected so as to permit both sections of tube 19 to operate at the center of the linear portions of their characteristic curves. Tube 19 is indicated as being a twin tetrode having a pair of control grids 21, 22, a pair of additional grids 23, 24 and a pair of anodes 25, 26.

Control grids 21, 22 are connected to the outside terminals of secondary 13, thereby being energized in push-pull fashion. Anodes 25, 26 are energized cophasally from a source 3 of alternating current, which also supplies the pick-off unit 101, by way of conductor 27, output resistors 28, 29, and tuned chokes 30, 31, tuned to the frequency of the source 3. The other terminal of source 3 is connected by wire 32 to center tap 16 of secondary winding 13. Grids 23, 24, which act as screen grids in the present illustration, are energized from source 3 by way of a voltage dropping resistor 33. Bypass condenser 34, 35, 36, 37 are also used.

In the absence of an input voltage to grids 21, 22, the circuits of both sections of tube 19 are balanced, so that equal (and opposite) voltages will appear across output resistors 28, 29.

In operation, the output of pickoff device 101 will be an alternating voltage having the same or opposite phase with respect to that of source 3. Phase adjuster 10, which may be a variable condenser, is adjusted to assure this proper phase relation. This phase adjuster may be inserted in lines 38, if desired. The output voltage is fed in push-pull to the control grids 21, 22 by way of transformer 12. Hence, one of the two grids 21, 22 will have an impressed voltage thereon of the same phase as its corresponding anode, and the other will have opposite phase, it being noted that both anodes 25, 26 are energized in like phase from source 3. Which particular grid 21 or 22 has the same phase as its corresponding anode will depend on the phase of the output voltage from pickoff device 101, and will, therefore, depend on the sense of the relative motion between the armatures 8, 9 and field of armature 1 of the pickoff device 101. For purposes of illustration, let it be assumed that grid 21 has a voltage impressed on it in phase with its anode 25. Then, during the half-cycles of voltage supply from source 3 when anode 25 is positive with respect to cathode 17, the upper section of tube 19 will be more conductive than with zero voltage applied to grid 21, and an increased output voltage will appear across output resistor 28. During the other half-cycle, the conduction of this section of tube 19 will be blocked by its anode voltage, which is then negative with respect to cathode 17. The upper section of tube 19, therefore, acts as a half-wave rectifier. Tuned choke 30 and bypass condensers 34, 35 prevent the alternating component of the output voltage of tube 19 from appearing across output resistor 28.

At the same time, in the illustrative example used, grid 22 will have a negative voltage applied to it during the positive anode half-cycle, so that the current in, and the voltage drop across, resistor 29 will decrease from the value with zero voltage on grid 22. The net change in direct voltage across resistors 28 and 29 corresponds in magnitude to the magnitude of the alternating voltage output from pickoff device 101, and in sense to the phase of that voltage, and thereby to the relative deviation of the pickoff armature. Tube 19, therefore, acts as a phase-sensitive amplifier and half-wave rectifier from the signal voltage from the pickoff device 101.

Connected across output resistor 28 is a differentiating circuit comprising condenser 39 and variable resistance 40. A similar differentiating circuit 41, 42 is connected across the other output resistor 29.

Since condenser 39 (or 41) will pass current only if the voltage applied from resistor 28 (or 29) is varying, it will be evident that this current corresponds to a rate of change, or time derivative, of the voltage output of tube 19, and therefore, of the voltage output of pickoff 101. This "rate" current, flowing through resistor 40 (or 42) will produce a "rate" voltage, adjustable in magnitude by adjusting the resistance value of resistor 40 (or 42). This "rate" voltage is applied to a similar differentiating circuit 43, 44 to produce a voltage across resistor 44 corresponding to "acceleration"; that is, the time derivative or rate of change of the "rate" voltage. In order that the voltage across resistor 44 may have a "rate" component in addition to its "acceleration" voltage, variable resistor 45 is shunted across condenser 43, thereby permitting an adjustable component of "velocity" current to flow through resistor 44. A similar circuit 46, 47, 48 is placed in the lower section of the push-pull circuit. Adjusting resistor 40 (or 42) will adjust the amount of "rate" voltage produced, and will, therefore, also adjust the "acceleration" voltage produced, since the second differentiating circuit 43, 44 (or 46, 47) depends for its input on the voltage across resistor 40 (or 42). Adjusting resistor 45 (or 48) adjust the relative amounts of "rate" and "acceleration" components produced across resistor 44. This may be readily seen from the fact that with zero value for resistance 45, no differentiation is possible, and the output is "velocity" only. With infinite resistance value for 45, no "velocity" component is transmitted, and the output is pure "acceleration." Intermediate value of resistance, of course, provides varying relative amounts of "rate" and "acceleration" components.

In each of these differentiating circuits, the resistance (40, 44, 42, 47) is made small in value compared to the reactance of its corresponding capacitance (39, 43, 41, 46) at the low frequencies corresponding to the rates of variation of signal voltage magnitude, in order to provide effective differentiation. Also, the total impedance of the second differentiating circuits (43, 44 and 46, 47) is made high compared to that of resistance 40 or 42, in order to prevent undue loading of the first differentiating circuits (39, 40 and 41, 42).

In the same manner as the second derivative or "acceleration" voltage is obtained, third, fourth or higher derivatives, as desired, may also be obtained.

The combined "rate" and "acceleration" voltage appearing across the resistance 44 (47) is connected in series with a voltage representing the original signal or "displacement" voltage itself, obtained from secondary winding 14 (or 15) by means of magnitude adjusting potentiometer 49 (or 50). Winding 14, in the illustrative example used, is connected so as to increase the current to anode 51, while winding 15 is connected oppositely. The combined "displacement," "rate," and "acceleration" voltage is applied between cathode 52 (or 53) and control grid 54 (or 55) of tube 56, in series with cathode biasing resistor 57. Anodes 51, 58 of tube 56, are energized through their respective load resistors 59, 60 from source 3. It will be noted that one terminal of source 3 is already connected, by wire 27 and resistor 57 to cathodes 52, 53. Hence, wire 61 leading to anodes 51, 58 is connected to the other side of supply source 3. Grids 62, 63 act as screen grids and are connected to wire 61 by voltage dropping resistor 64.

Anode 51 is connected directly to control grid 65 of duplex tube 66, and similarly anode 58 is connected directly to grid 67. Anodes 51 and 58 are connected together by condenser 68. The common terminal 69 is connected to cathodes 70, 71 by cathode biasing resistor 72.

The anodes 73, 74 are energized from source 3 through their respective matched loads 75, 76 which form two similar and opposed field windings for direct current generator 77. These windings are bypassed by bypass condensers 78, 79. Since cathodes 70, 71 are directly connected to wire 61, anodes 73, 74 must be connected to the other terminal of source 3, as by conductor 27.

The field windings 75, 76 form highly inductive loads, which, when working out of low resistance driving sources, such as power amplifier tubes or gas-filled tubes, would have high time constants, preventing close following of the controlled motor. However, in the present system the generator fields are matched to the plate resistances of their respective amplifier tubes, and the combination is one inherently having a small time constant, permitting accurate control.

Tube 56 serves as a D. C. amplifier for the combined "displacement," "rate" and "acceleration" voltage connected to its control grids. Since this tube is energized by alternating current from source 3, it will conduct only during half cycles in which conductor 61 is positive with respect to cathodes 52, 53. Hence, voltage will appear across its output resistor 59 (or 60) only during these half-cycles. The circuits of both sections of tube 56 are also balanced, so that, with zero signal on both grids 54, 55, equal current will flow in, and equal voltage drops will appear across, output resistors 59, 60. Cathode biasing resistor 57 is selected in resistance value to provide operation about the center of the linear portion of the grid characteristic of each section of the tube 56.

It will be seen that, during those half cycles when tube 56 conducts, the total voltage drop across resistor 59 (or 60) will bias grid 65 (or 67). However, this will not affect that output of tube 66, since during those same half-cycles, anodes 73, 74 are negative and tube 66 does not conduct. During the other half cycles, no grid voltage would appear on grids 65, 67, as tube 56 is then non-conductive. To avoid this difficulty, condenser 68 is connected across grids 65 and 67, being also across output resistors 59, 60. With zero input to tube 56, condenser 68 is uncharged, since the stand-by or zero input voltage across resistor 59 balances and cancels that across resistor 60, leaving zero net voltage across condenser 68. When input voltage is applied to the grids 54, 55 of tube 56, the voltages across resistors 59, 60 will change, and in opposite directions, during half-cycles when anodes 51, 58 are positive. In the illustrative example used, the voltage across resistor 59 will increase, and that across 60 will decrease. The net change in voltage will charge condenser 68, so that, during the succeeding half-cycles, when tube 56 is non-conductive, this net voltage will persist and be maintained on grids 65, 67, and will control tube 66, since anodes 73, 74 are then positive. In this manner, the stand-by voltages across resistors 59, 60 have no effect on grids 65, 67, only the changes in these voltages being used in the succeeding stage. This arrangement provides a very successful direct-coupled direct-current amplifier directly energized from a single source of alternating current, since the standby voltages have no effect on the succeeding stage.

Condenser 68 may be made adjustable, and should be adjusted to give maximum output.

It is clear that the number of D. C. amplifier stages may be extended as much as desired, merely assuring that each stage is energized from the A. C. source in a phase relation opposite to that of the previous stage, and that some means, such as condenser 68, is used to enable "holdover" of the useful portion of the output voltage from the preceding stage, and to prevent the adverse biasing effect of the standby voltage drops.

The output currents of tube 66 are smoothed by condensers 78 and 79 and energize field windings 75 and 76 of generator 77, which form the load on, and are matched in impedance to, the sections of tube 66. Windings 75 and 76 are identical, and the sections of tube 66 are balanced so that equal currents will flow in windings 75, 76 with zero input to tube 66. Tube 66 is also operated at the center of the linear portion of the grid characteristic. Under these conditions the effects of the two windings 75, 76 cancel one another. When input voltage is applied to the grids 65, 67 of tube 66, in the manner described above, the current through one winding 75 or 76 will increase and that through the other will decrease, producing a net magnetic field whose magnitude and polarity correspond to the magnitude and polarity of the signal. The armature of generator 77 is driven at constant speed by any suitable means, such as motor 80, and will generate a voltage also corresponding to the combined signal. This generator output voltage is fed to the armature of direct current motor 81, whose field 82 has fixed excitation from a suitable direct current source. The generator 77 together with motor 81 constitute a servo-mechanism in which the generator field windings 75 and 76 are the differentially connected control windings of the mechanism. The armature resistance of motor 81 is matched to that of the generator 77, including the effect of armature reacton, so as to provide maximum power transfer therebetween. Hence, motor 81 will turn at a speed corresponding to the combined voltage and in a direction corresponding to the signal voltage phase. Motor 81 may be directly coupled, as by pulley arrangement 83, to any type of load, such as rudder 84, or a follow-up device.

Tubes 19, 56 and 66 have been illustrated as being of the duplex or twin type of tube. It is obvious that two separate tubes could be used in place of each of these twin tubes. Also, these tubes need not be tetrodes or triodes, as shown. It is immaterial whether they be triodes, tetrodes, pentodes or other types of tubes, so long as they operate as linear amplifier tubes. Also, they may be of the vacuum or grid-controlled gas-filled type.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A phase-sensitive servomotor system comprising a source of alternating current, a signal voltage generator energized thereby, a servomotor, and a phase-sensitive amplifier having its input connected to receive the signal voltage derived from said generator and its output connected in controlling relation to said motor, said amplifier comprising a first and a second amplifying electron discharge tube each having an input circuit and an output circuit, means for directly connecting the output circuit of said first tube to the input circuit of said second tube, means for connecting said alternating current source in said output circuits in opposite phase, and means connected to the input circuit of said second tube for carrying over the signal amplified by said first tube during one half-cycle of said source to the succeeding half-cycle, whereby said second tube may further amplify said carried over signal during said succeeding half-cycle.

2. A phase-sensitive servomotor system comprising a source of alternating current, a signal voltage generator energized thereby, a servomotor, and a phase-sensitive amplifier having its input connected to receive the signal voltage derived from said generator and its output connected in controlling relation to said motor, said amplifier comprising a first pair of electron discharge tubes arranged in push-pull fashion, means for energizing said pair of tubes from said alternating current source, a second pair of electron discharge tubes also arranged in push-pull fashion, means connecting the input circuit of said second pair directly to the output circuit of said first pair, means for energizing said second pair from said source in phase opposition to the energization of said first pair, and means for carrying over only the difference of the outputs of said first pair of tubes to the inputs of said second pair.

3. A phase-sensitive servomotor system comprising a source of alternating current, a signal voltage generator energized thereby, a servomotor, and a phase-sensitive amplifier having its input connected to receive the signal voltage derived from said generator and its output connected in controlling relation to said motor, said amplifier comprising a first pair of electron discharge tubes connected in push-pull fashion, an output resistor connected to the output of each tube, means for energizing said tubes cophasally from said alternating current source through their respective resistors, a second pair of electron discharge tubes, means connecting the input circuits of said second pair of tubes directly across the respective output resistors of said first pair of tubes, means for energizing said second pair of tubes from said alternating current source in phase opposition to said first pair of tubes, and capacitance connected in shunt with the output resistors of said first pair of tubes for carrying over the voltage across said resistors from one-half cycle of said source to the succeeding half-cycle.

4. A system as in claim 3 in which said last means comprises a single condenser connected across both said resistors.

5. A phase-sensitive servomotor system comprising a source of alternating current, a signal voltage generator energized thereby, a servomotor, and a phase-sensitive amplifier having its input connected to receive the signal voltage derived from said generator and its output connected in controlling relation to said motor, said amplifier comprising a first and second electron tube, each having a plate and cathode and control electrode for controlling the space discharge therebetween, means for energizing said tubes from said alternating current source in out-of-phase relation, means for directly connecting the output of the first tube to the control electrode of the second tube, and means for supplying the signal voltage output from the first to the second tube after the first tube ceases to conduct.

6. A phase-sensitive servomotor system comprising a source of alternating current, a signal voltage generator energized thereby, a servomotor, and a phase-sensitive amplifier having its input connected to receive the signal voltage derived from said generator and its output connected in controlling relation to said motor, said amplifier comprising a first and second electron tube each including a cathode, plate and control electrode, means for directly connecting the plate of the first tube to the control electrode of the second tube, means connected with said alternating current source for energizing the plates of said tubes in out-of-phase fashion, a load impedance in the cathode-plate circuit of said first tube and capacitance connected in shunt with said load impedance and with the control electrode of said second tube for sustaining the signal output of the first tube and applying it to the control electrode of the second tube during the half cycle when said second tube is conductive.

7. A phase-sensitive servomotor system comprising a source of alternating current, a signal voltage generator energized thereby, a servomechanism having differentially connected control windings and an amplifier having its input connected to receive the signal voltage derived from said generator and its output connected with the differential control windings of said servo mechanism comprising a first stage and a second stage, each stage comprising a pair of electron tubes connected together in push-pull fashion, means connected with said alternating source for energizing the tubes of one stage in out-of-phase relation to those of the other stage, means for directly connecting the tube outputs of the first stage to the tube inputs, respectively, of the second stage, and capacitance connected across the output of the first stage for sustaining the signal voltage and applying it to the input of the second stage during the half-cycle when it conducts, the output of said second stage being connected differentially to energize the differential control windings of said servo-mechanism.

8. A phase-sensitive servomotor system comprising a source of alternating current, a signal voltage generator energized thereby, a servomechanism having differentially connected control windings and an amplifier having its input connected to receive the signal voltage derived from said generator and its output connected with the differential control windings of said servo-mechanism comprising first and second stages, each stage including a pair of electron tubes connected together in push-pull fashion, means connected with said alternating source for energizing the tubes of a stage in in-phase relation but the two stages in out-of-phase relation, a load resistor connected across the output of the tubes of the first stage, means for directly connecting the tube outputs of the first stage and the tube inputs of the second stage, and capacitance means for sustaining the voltage output of the first stage and applying it to the tube inputs of the second stage when the tubes of said second stage are rendered conductive, the tube outputs of said second stage being connected differentially to energize the differential control windings of said servo-mechanism.

PERCY HALPERT.

REFERENCES CITED

The following references are of record in the file of this patent:

UNITED STATES PATENTS

| Number | Name | Date |
| --- | --- | --- |
| 1,703,280 | Minorsky | Feb. 26, 1929 |
| 1,905,985 | Hollerith | Apr. 25, 1933 |
| 2,085,488 | Woodward | June 29, 1937 |
| 2,088,654 | Hull | Aug. 3, 1937 |
| 2,131,759 | Satterlee | Oct. 4, 1938 |
| 2,207,976 | Ferrell | July 16, 1940 |
| 2,398,421 | Frische | Apr. 16, 1946 |